(No Model.)
J. W. CAMPBELL.
CULINARY BOILER.
No. 246,720. Patented Sept. 6, 1881.
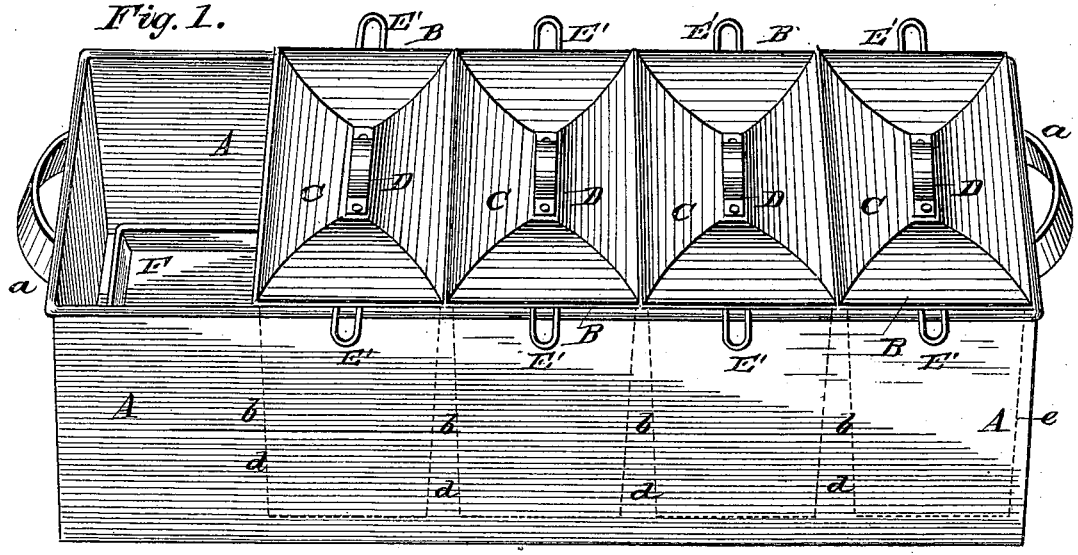
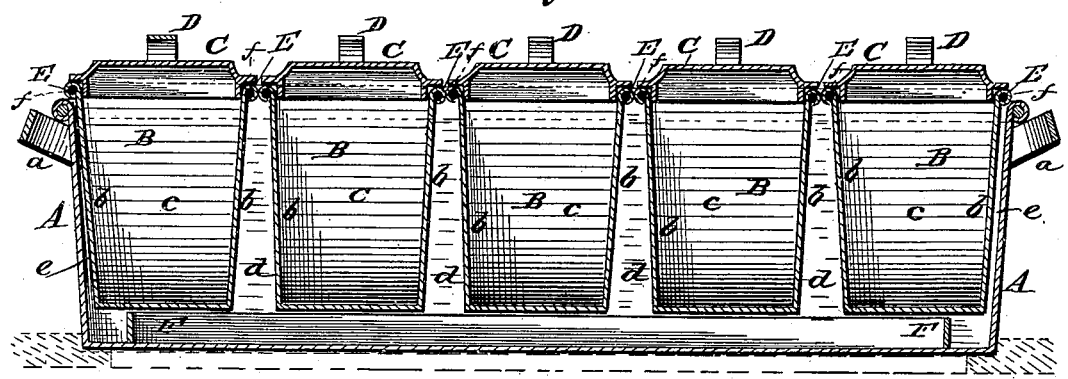
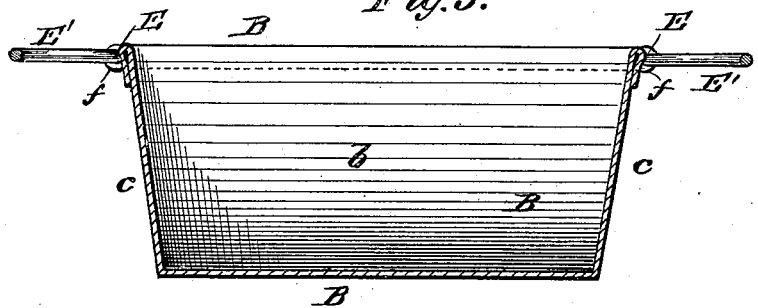
WITNESSES
H. Clay Smith
P. C. Dieterich
INVENTOR
James W. Campbell
By his Attorneys
Louis Bagger & Co.
N. PETERS, Photo-Lithographer, Washington, D. C.

UNITED STATES PATENT OFFICE.

JAMES W. CAMPBELL, OF CARTHAGE, MISSOURI.

CULINARY BOILER.

SPECIFICATION forming part of Letters Patent No. 246,720, dated September 6, 1881.

Application filed May 23, 1881. (No model.)

*To all whom it may concern:*

Be it known that I, JAMES W. CAMPBELL, of Carthage, in the county of Jasper and State of Missouri, have invented certain new and useful Improvements in Culinary Boilers; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved culinary boiler with one of the pans removed. Fig. 2 is a longitudinal vertical section of the same; and Fig. 3 is a longitudinal vertical section of one of the pans or cooking-vessels.

Similar letters of reference indicate corresponding parts in all the figures.

My invention contemplates an improved construction of culinary compartment-boilers, as hereinafter more fully set forth, and particularly pointed out in the claim.

In the annexed drawings, A is a pan of rectangular shape, made, by preference, of cast-iron or galvanized sheet-iron, from six to twelve inches deep, and having a flat bottom or a bottom cast or pressed so as to fit into the griddle-holes in the top of the stove, as shown by dotted lines in Fig. 2. This pan is made with inclined sides and ends, which latter are provided with the handles *a a*.

B B are the boilers, of which, in the present illustration of my invention, I have shown five; but there may, of course, be more or less. Each of these boilers has inclined sides and ends, (shown at *b* and *c* respectively,) thus leaving wedge-shaped spaces *d e* between the several boilers and between each individual boiler and the sides of the pan A when they are all placed in the pan alongside of and impinging upon one another. Each of the boilers B is provided with a closely-fitting cover, C, having a handle, D. The inclined ends *c* of the boilers B are provided with projecting ears E', one at each end, which are made by forming a loop or bail on the re-enforcing wire E, which is inserted through the head *f* along the upper edge of the boiler. This wire projects at both ends out through slots or openings in the head, and is bent to form the said loops or bails E' E', which serve as handles for the boilers, and also (in some cases) form the rests by means of which the boilers are supported upon the rim of the pan A. If desired, however, this pan may be made with a standing web or flange, F, in its bottom, equidistant from the sides and ends of the pan, which, when used, forms an additional support for the boilers B, whose bottoms rest upon the flange. I prefer this construction in the large size of boilers.

It will be seen that the boilers do not touch either the bottom or the sides of the pan into which they are inserted except at their upper rim, so that the steam generated from the water which is placed in the bottom of pan A will rise up into the spaces *b* and *c* between the boilers which contain the vegetables or other articles to be cooked.

It will also be seen that the boilers are entirely independent of one another, each having its separate cover, so that there is no danger of "flavoring" the contents of one of the boilers with those of another, which is the greatest objection to most of the culinary compartment steam-boilers in general use.

Having thus described my invention, I claim and desire to secure by Letters Patent of the United States—

The culinary boiler composed of the rectangular pan A, having inclined sides and ends and provided with the bottom flange, F, and handles *a a*, and a set or series of boilers, B, arranged transversely in the pan A, and having inclined sides and ends to form the dividing wedge-shaped compartments or steam-chambers *b c*, said boilers being provided with closely-fitting covers C, and ears E' E', projecting out over the sides of the pan A, substantially as shown and specified, for the purpose set forth.

In testimony that I claim the foregoing as my own I have hereunto affixed my signature in presence of two witnesses.

JAMES W. CAMPBELL.

Witnesses:
A. D. COX,
JOHN G. PETERS.